Figure 1:
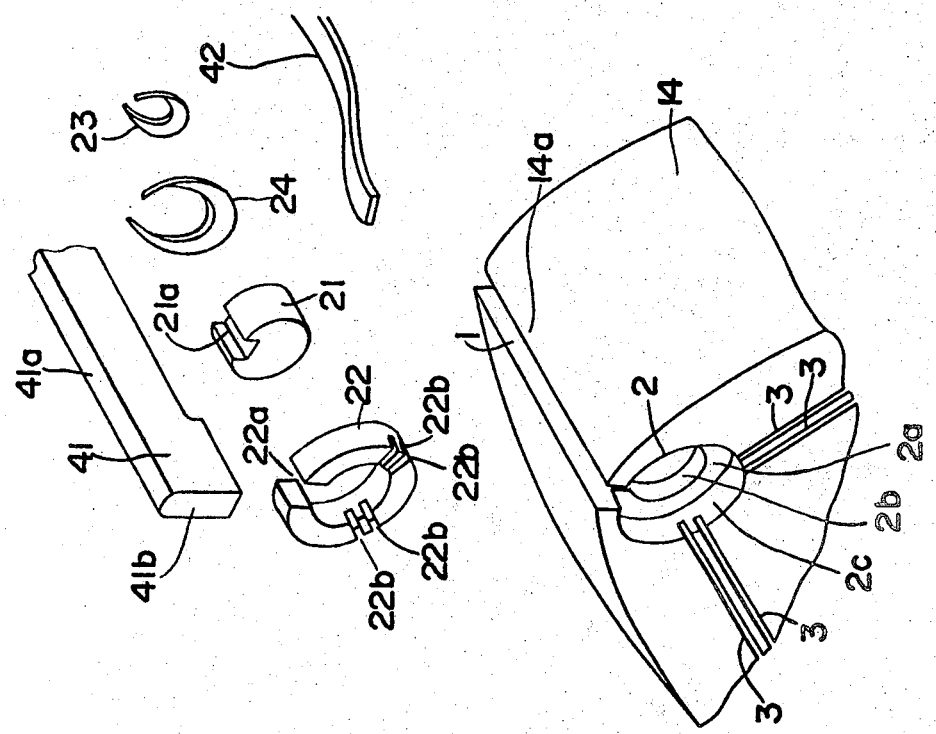

United States Patent [19]

Shimoji et al.

[11] 3,830,600
[45] Aug. 20, 1974

[54] ROTARY PISTON SEALING ARRANGEMENT

[75] Inventors: Masaharu Shimoji; Hideo Shiraishi, both of Hiroshima-ken, Japan

[73] Assignee: Toyo Kogyo Co. Ltd., Fuchu-cho, Aki-gun, Hiroshima-ken, Japan

[22] Filed: Aug. 28, 1972

[21] Appl. No.: 284,114

[52] U.S. Cl................... 418/113, 418/122, 418/142
[51] Int. Cl............................................... F04f 1/18
[58] Field of Search................... 418/133, 122–124, 418/142

[56] References Cited
UNITED STATES PATENTS

| | | | |
|---|---|---|---|
| 3,064,880 | 11/1962 | Wankel et al. | 418/142 |
| 3,127,095 | 3/1964 | Froede | 418/122 |
| 3,180,562 | 4/1965 | Bentele | 418/122 |
| 3,674,384 | 7/1972 | Larrinaga et al. | 418/142 |
| 3,711,229 | 1/1973 | Kurio | 418/142 |
| 3,721,510 | 3/1973 | Gilbert | 418/123 |

*Primary Examiner*—C. J. Husar
*Attorney, Agent, or Firm*—Craig and Antonelli

[57] ABSTRACT

A sealing arrangement for use in a rotary piston engine employing a double sealing system for maintaining each one of the working chambers, conditioned in the intake, compression, power and exhaust strokes, respectively, in a gas-tight condition within the engine housing structure. To this end, the rotary piston capable of undergoing planetary motion within the engine housing structure for producing a power through a power output shaft is provided with at least three apex seals on piston lobes of the rotary piston, double corner seals provided on each end face of the rotary piston adjacent to the piston lobes and double side seals each extending between one of the double corner seals to another.

4 Claims, 4 Drawing Figures

PATENTED AUG 20 1974

3,830,600

SHEET 1 OF 2

ROTARY PISTON SEALING ARRANGEMENT

The present invention relates to a sealing arrangement in a rotary piston engine and, more particularly, to a double sealing arrangement provided in a multi-lobed rotary piston of the rotary piston engine for maintaining each one of the working chambers in a gastight condition.

In a conventional rotary piston engine having a three-lobed rotary piston formed with three piston lobes, various sealing elements such as apex seals, side seals and corner seals are provided which are forcibly slidably engaged with the inner surfaces of the housing structure forming the body of the rotary piston engine while maintaining each one of the working chambers in a gastight condition. Each one of the apex seals, the side seals and the corner seals provided in the conventional rotary piston engine comprises a single sealing material and, accordingly, it has been often experienced that, in view of the fact that each of the side seals has both ends slidably contacted with the peripheral surface of the corresponding one of the corner seals, gas leakage occurs through the connection between any one of the ends of the side seal and the associated corner seal. If the gas leakage occurs considerably, the power output of the engine will be reduced with an unnecessary consumption of fuel which ultimately leads to increase of engine maintenance cost.

In order to improve the sealing effect in the engine of the above-described kind, it has been attempted but in vain to increase the contact area between any one of the various sealing elements and the inner surfaces of the engine housing structure. This is because formation of the uniformly smooth and/or flat contact surface in any one of the various sealing elements to be forcibly slidably engaged with the inner surfaces of the engine housing structure has been found to be difficult and, if neither difficult nor impossible, has a tendency to increase the cost of manufacture of the engine of the above-described kind.

Accordingly, an essential object of the present invention is to provide a double sealing arrangement in the rotary piston engine which is capable of exhibiting an improved sealing effect given between the stationary member and the movable member used in the engine with substantial elimination of the disadvantages inherent in the conventional sealing arrangement.

Another important object of the present invention is to provide a double sealing arrangement of the above type wherein each of any one of the corner seals and the side seals comprises a pair of sealing elements for improving the sealing effect.

A further object of the present invention is to provide a double sealing arrangement of the above type wherein a triplet of pairs of side sealing elements on both end faces of the rotary piston have respective end portions received by one of the pair of the corner sealing elements mounted on the other corner sealing elements for advantageously preventing the occurrence of gas leakage which may otherwise take place through the connection between the side sealing element and the corner sealing element as has been often experienced in the conventional sealing arrangement.

A still further object of the present invention is to provide a double sealing arrangement of the above-described type which can be manufactured easily and without substantially requiring increase of the manufacturing steps heretofore practiced in the mass-production line and also of the manufacturing cost.

According to the present invention, each of the corner seals comprises an inner sealing member and an outer sealing member mounted on said inner sealing member, both of which are collapsibly accommodated in a stepped recess formed on both end faces of the rotary piston and adjacent to each one of the three piston lobes. While the inner sealing member collapsibly carries a corresponding one of the apex seals extending across the thickness of the rotary piston, the outer sealing member is formed with at least a pair of grooves in which adjacent end portions of the oppositely extending side sealing members are tightly received. Furthermore, in the above arrangement, the inner and outer sealing members are independently collapsible, the sealing effect obtainable by either the inner sealing member or the outer sealing member will not be substantially lost even if the other sealing member is biased inwardly of the stepped recess with the sliding end face leaving away from the inner surface of the engine housing structure.

Figure 2:
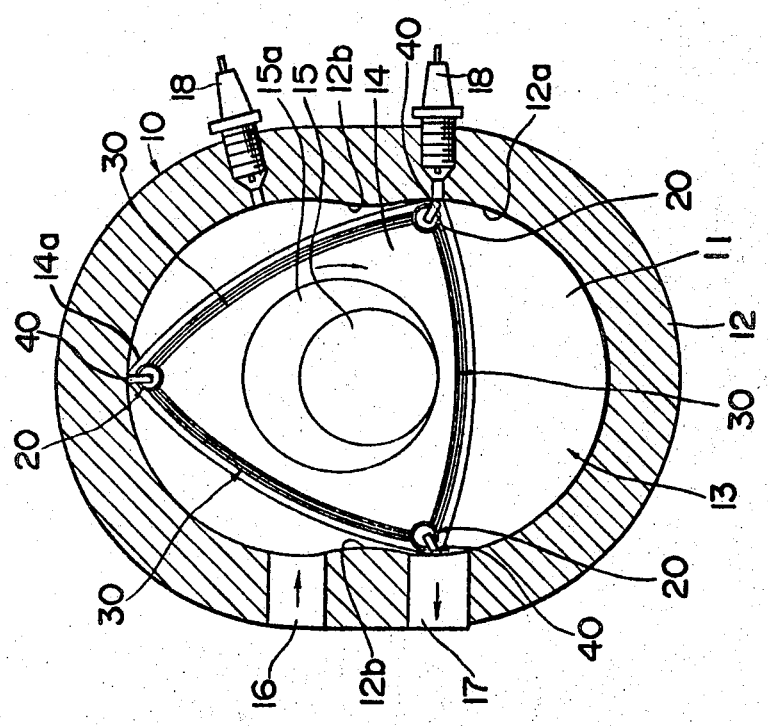
Figure 3:
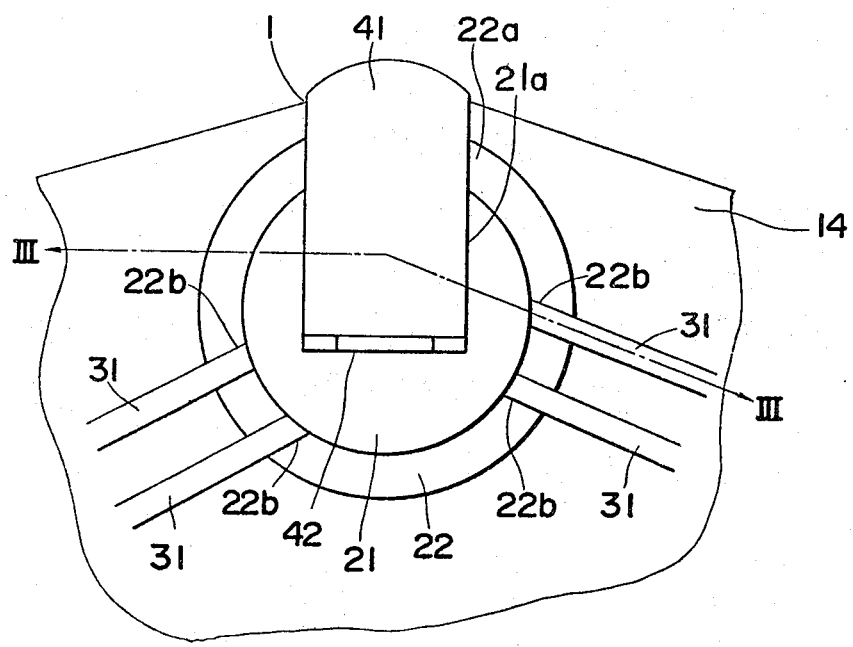
Figure 4:
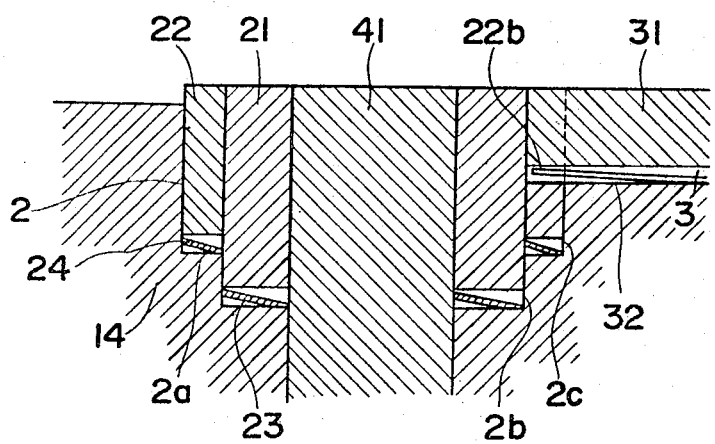

These and other objects and features of the present invention will become apparent from the following description taken in conjunction with a preferred embodiment with reference to the accompanying drawings, in which:

FIG. 1 is a schematic side sectional view of a rotary piston engine embodying the present invention, FIG. 2 is an exploded view of an essential portion of a rotary piston used in the rotary piston engine shown in FIG. 1, to which the present invention is exclusively directed, FIG. 3 is a schematic side elevational view of the essential portion of FIG. 2, and FIG. 4 is a schematic cross-sectional view taken along the line III—III shown in FIG. 3.

Before the description of the present invention proceeds, a general construction of a typical model of a rotary piston engine heretofore largely available will be first described with reference to FIG. 1 and FIG. 2 for facilitating a better understanding of the present invention.

The rotary piston engine, which is also known as Wankel engine, comprises a housing structure 10 having axially spaced end walls 11 and a peripheral wall 12 interconnecting the end walls 11 to form a cavity 13 therebetween, and a three-lobed rotary piston 14 rotatably mounted in said cavity 13 and coaxially journalled with and on an eccentric portion 15a of a power output shaft 15 which extends axially through the center of the cavity 13 and coaxially journalled in the end walls 11 of the housing structure 10 such as to permit the three-lobed rotary piston 14 to undergo planetary motion thereby to produce a power output through the power output shaft 15. The peripheral wall 12 has an epitrochoidally shaped inner surface 12a, which is formed with at least two circumferentially spaced lobes 12b protruding inwardly toward the cavity 13, and formed with a pair of spaced intake and exhaust ports 16 and 17, respectively communicated with a source of fuel-air mixture and the atmosphere, and a pair of ignition plugs 18. In this rotary piston engine, the four strokes of intake, compression, power and exhaust are simultaneously carried out around the three-lobed rotary piston 14 when the engine is running. At this time, each of a plurality of working chambers A, B and C respectively defined between arcuate flanks of the three-lobed rotary piston 14 and the epitrochoidally shaped inner surface 12a of the peripheral wall 12 within the cavity 13 is successively conditioned in the intake, compression, power and exhaust strokes and varies in volume as the three-lobed rotary piston 14 undergoes the planetary motion.

As is well known by those skilled in the art, the prime motive for the planetary motion of the rotary piston 14 which produces the power output of the rotary piston engine through the power output shaft 15 is an explosion of compressed fuel-air mixture within one of the working chambers which has entered in the power stroke. To ensure the power output of the rotary piston engine as high as possible, the substantially whole amount of energy generated by the explosion of the fuel-air mixture must be transmitted to one of the arcuate flanks of the three-lobed rotary piston 14, which is exposed to the working chamber then conditioned in the power stroke, thus causing said rotary piston 14 to move under planetary motion.

The rotary piston engine so far described may be of any known construction. However, according to the present invention, a double sealing arrangement is provided in the three-lobed rotary piston 14 for ensuring an air tight condition of each one of the working chambers A, B and C within the cavity 13. As shown in FIG. 1, the sealing arrangement comprises a triplet of corner seals 20 provided on both end faces of the rotary piston 14, a triplet of side seals 30 provided on both end faces of the rotary piston 14 and each extending between the two adjacent corner seals 20 substantially in parallel relation to the curved plane of a corresponding one of the arcuate flanks of the rotary piston 14, and a triplet of apex seals 40 provided on the piston lobes 14a and each extending across the thickness of the rotary piston 14 between the end walls 11 of the housing structure 10 in parallel relation to the epitrochoidally shaped inner surface 12a.

The details of the present invention will be now described particularly with reference to FIG. 2 through FIG. 4, wherein only a portion of the sealing arrangement provided on one of the opposite flat end faces of the rotary piston and adjacent to one of the three piston lobes 14a is shown for the sake of simplification. However, it is to be noted that, although the present invention will be described in connection with the illustrated portion of the sealing arrangement, this description is to be understood as equally applicable to the other flat end face of the rotary piston 14 and the other piston lobes 14a which are not illustrated.

Referring now to FIG. 2 through FIG. 4, the rotary piston 14 is formed on the piston lobe 14a with a groove 1 extending between the opposite flat end faces of the rotary piston 14 in parallel relation to the longitudinal axis of said piston 14. On each of the flat end faces of the piston 14 and adjacent to each of the three piston lobes 14a, a circularly recessed portion 2 and a couple of pairs of grooves, generally indicated by 3, are formed.

The circularly recessed portion 2 is stepped at a substantially intermediate portion thereof as at 2a to provide an inner recess 2b and an outer recess 2c of a diameter greater than that of the inner recess 2b. It is to be noted that the contour of the stepped intermediate portion 2a of said recessed portion 2 is in the form of a split ring shape due to the depth of the groove 1 reaching to a point immediately below the horizontal center line, as viewed from FIG. 3, of the contour of the inner recess 2b of said recessed portion 2.

The couple of pairs of the grooves 3 shown extend between the illustrated recessed portion 2 and the other non-illustrated recessed portions, respectively, with another non-illustrated pair of the grooves extending between said other non-illustrated recessed portions. In other words, as envisaged from FIG. 1 and so far as the rotary piston 14 is of substantially triangular or three-lobed shape, the grooves 3 are in practice provided in three pairs, each pair extending between the adjacent recessed portions 2 of any pair in spaced relation with respect to each other and in parallel relation with respect to the curved plane of corresponding one of the arcuate flanks of the rotary piston 14. Furthermore, as clearly shown in FIGS. 2 and 4, each end extremity of any one of the grooves 3 is open toward the outer recess 2c of the recessed portion 2, the function of these grooves 3 being mentioned later.

Each one of the corner seals 20 comprises an inner seal member 21 of a diameter substantially equal to that of the inner recess 2b and an outer seal member 22 of a diameter substantially equal to that of the outer recess 2c. The inner seal member 21 is formed on its periphery with a longitudinally extending groove 21a of the same width as that of the groove 1 and slidably accommodated within the inner recess 2b with the depth of said longitudinally extending groove 21a laying in the same plane as the depth of said groove 1. This inner seal member 21 is normally outwardly biased by a resilient member 23, such as wire spring or plate spring, of a split ring shape operatively interposed between the depth of the inner recess 2b and the adjacent end face of the inner seal member 21 so that the other end face of the inner seal member 21 is in sliding engagement with the inner surface of the corresponding end wall 11.

The outer seal member 22 is in the form of a split ring shape and has a split portion 22a of the same width as that of the groove 21a of the inner seal member 21 and, hence, the groove 1. This seal member 22 is formed on an outer end face with a couple of spaced pairs of grooves, generally indicated by 22b, and slidably accommodated within the outer recess 2c and mounted on a portion of the inner seal member 21 in such a manner that the split portion 22a is situated just above the groove 21a while the grooves 22b are registered with the corresponding grooves 3 on the end face of the rotary piston 14. This outer seal member 22 is also outwardly biased by a resilient member 24, such as wire spring or plate spring, of a split ring shape operatively interposed between the annular stepped portion 2a and the adjacent end face of the outer seal member 22 so that the other end face of the outer seal member is in sliding engagement with the inner surface of the corresponding end wall 11.

Each of the side seals 30 comprises a pair of inside and outside sealing strips 31 collapsibly accommodated within the corresponding grooves 3 through respective spring members 32 (FIG. 4), each of which may be either a leaf spring or a wavy spring wire, disposed between the depths of the grooves 3 of each pair and lengthwise edges of said inside and outside sealing strips 31. These spring members 32 act to bias the inside and outside sealing strips 32 outwardly of the grooves 3 so that the other lengthwise edges of said inside and outside sealing strips 32 are brought into sliding engagement with the inner surface of the corresponding end wall 11. It is to be noted that each end extremity of any one of the inside and outside sealing strips 32 is received in the corresponding one of the grooves 22b formed in the outer seal member 22.

Each of the apex seals 40 comprises a sealing bar 41 of any suitable or conventional configuration and of a length substantially equal to the distance between the inner surfaces of the opposite end walls 11, which is collapsibly accommodated within the groove 1 through a wavy plate spring 42 normally acting to outwardly bias said sealing bar 41. As is well known to those skilled in the art, this sealing bar 41 has a rounded sliding surface 41a engageably with the epitrochoidal inner surface 12a of the peripheral wall 12 and a pair of sliding end faces, only one of which is shown by 41b, engageable with the inner surfaces of the corresponding end walls 11. Nevertheless, in the condition in which the sealing bar 41 is collapsibly accommodated within the groove 1, both end portions of said sealing bar 41 are respectively received in the grooves 21a of the inner sealing members 21 through the split portions 22a of the outer sealing members 22.

From the foregoing description, it has now become clear that, in view of the sealing arrangement made in double construction according to the present invention, the more air-tightly sealed condition can be obtained between the stationary element and the movable element than in the conventional sealing arrangement made in single construction. More specifically, by the provision of the outer sealing member 22 mounted on the inner sealing member 21 and carrying in place an end portion of at least one pair of the sealing strips 31 while permitting the end extremity of said pair of said sealing strips to slidably engage with the peripheral surface of the inner sealing member 21, gas leakage can be substantially eliminated which may otherwise occur from each one of the working chambers A, B and C toward the inside of the rotary piston through the connection between each sealing strip and the inner sealing member as has been experienced in the conventional sealing arrangement. Furthermore, since the inner and outer sealing members 21 and 22 are independently collapsible within the recessed portions 2 formed in the rotary piston 14, the sealing effect obtainable by either the inner sealing member 21 or the outer sealing member 22 will not be substantially lost even if the other sealing member 22 or 21 is inwardly biased with the sliding end face leaving away from the inner surface of the corresponding end wall 11.

It is also clear that the manufacture of the sealing arrangement for the rotary piston 14 according to the present invention can be easily carried out without substantially requiring increase of the manufacturing steps heretofore practiced in the mass-production line.

Although the present invention has been fully described by way of example with reference to the accompanying drawings showing the preferred embodiment thereof, it is to be noted that various changes and modifications are apparent to those skilled in the art. Such changes and modifications are, unless otherwise departing from the scope of the present invention, to be understood as included therein since the present invention is not to be limited by the above preferred embodiment thereof.

What is claimed is:

1. A sealing arrangement for use in a rotary piston engine including a housing structure having spaced end walls and a peripheral wall between said end walls and having an epitrochoidal inner surface forming a cavity, and a rotary piston eccentrically rotatably mounted on a power output shaft within said cavity and having circumferentially spaced piston lobes and substantially flat end faces at opposite ends thereof, said rotary piston within said cavity forming a plurality of working chambers between said rotary piston and said housing structure, each of said working chambers being capable of varying in volume during the planetary motion of said rotary piston performing each four strokes of intake, compression, power and exhaust, the sealing arrangement comprising apex seals collapsibly mounted on said piston lobes and extending across the thickness of said piston between said end walls of said housing structure in parallel relation to the longitudinal axis of said output shaft and adapted to slidingly engage with the inner surface of said housing structure, corner seals provided for each apex seal and on each end face of said rotary piston, each of which corner seals includes a first sealing member formed with a groove for receiving therein a corresponding end portion of said apex seal and having one end face adapted to slidably engage with a corresponding one of the end walls and a second sealing member mounted on said first sealing member and having one end face adapted to slidably engage with said end wall, a combination of said first and second sealing members being collapsibly accommodated in a bore formed on each end face of said rotary piston adjacent to each piston lobe, said second sealing member being formed on said end face with at least one pair of spaced notches, and side seals provided on each end face of said rotary piston and each extending between one of said corner seals to another and having both ends received in said notches of the two adjacent second sealing member.

2. A sealing arrangement as claimed in claim 1, wherein said bore on each end face of said rotary piston adjacent to each piston lobe is formed with a small diameter portion for receiving therein the other end of said first sealing member and a large diameter portion for receiving therein the other end of said second sealing member.

3. A sealing arrangement as claimed in claim 2, wherein a pair of resilient members, each of which is in the form of a split ring shape, are respectively provided in said small diameter and large diameter portions of said bore for urging said first and second sealing members to move outwardly of said bore with the opposite end faces of said first and second sealing members forcibly slidably engaged with the corresponding end wall within the cavity of the housing structure.

4. A sealing arrangement as claimed in claim 1, wherein said second sealing member formed with a couple of the notches of each pair and wherein each of said side seals comprises a pair of outside and inside sealing strips each having both end portions received in the nothces of each couple of the two adjacent second sealing members.

* * * * *